United States Patent
Eck

(10) Patent No.: US 7,779,993 B2
(45) Date of Patent: Aug. 24, 2010

(54) APPARATUS FOR TRANSPORTING FREIGHT

(75) Inventor: Alexander Eck, Poppenhausen (DE)

(73) Assignee: Wittenstein AG, Ingersheim (DE)

( * ) Notice: Subject to any disclaimer, the term of this patent is extended or adjusted under 35 U.S.C. 154(b) by 21 days.

(21) Appl. No.: 12/192,464

(22) Filed: Aug. 15, 2008

(65) Prior Publication Data
US 2009/0047112 A1  Feb. 19, 2009

(30) Foreign Application Priority Data
Aug. 15, 2007  (DE) .................... 10 2007 038 686

(51) Int. Cl.
*B65H 20/00*  (2006.01)
(52) U.S. Cl. .................... 198/782; 193/35 SS
(58) Field of Classification Search .................. 198/782; 193/35 SS
See application file for complete search history.

(56) References Cited

U.S. PATENT DOCUMENTS

| | | | | |
|---|---|---|---|---|
| 3,709,450 A | * | 1/1973 | Watts et al. .................... 410/79 |
| 5,437,585 A | * | 8/1995 | Sundseth .................... 475/331 |
| 5,938,003 A | * | 8/1999 | Huber et al. .................. 198/782 |
| 5,960,934 A | * | 10/1999 | Huber et al. .................. 198/782 |
| 5,984,615 A | * | 11/1999 | Sundseth .................... 414/534 |
| 6,283,353 B1 | * | 9/2001 | Gilbert .................... 226/190 |
| 6,834,758 B2 | * | 12/2004 | Nguyen et al. ............. 198/782 |
| 2007/0057120 A1 | * | 3/2007 | McConnell .............. 244/118.1 |

FOREIGN PATENT DOCUMENTS

JP        06016233 A  *  1/1994  .................. 198/782

* cited by examiner

*Primary Examiner*—Mark A Deuble
(74) *Attorney, Agent, or Firm*—Dykema Gossett PLLC

(57) ABSTRACT

An apparatus for transporting freight, such as freight containers in freight compartments of aircraft, the apparatus including a power-drive unit including a transport roller and a lifting unit. The lifting unit includes a housing and at least one actuator that acts on at least one actuating element. The actuator is supported in an axially movable manner within the housing, and the lifting unit is configured to provide an equalization of separated forces to the actuating element.

8 Claims, 4 Drawing Sheets

APPARATUS FOR TRANSPORTING FREIGHT

This invention relates to an apparatus for transporting freight, in particular, freight containers in the freight compartments of aircraft, in particular, a power-drive unit having a transport roller and a lifting unit.

Power-drive units (PDUs) are typically used in conventional apparatuses for transporting freight, these units functioning to effect the active and/or passive transport of freight containers in freight compartments of aircraft.

In the field of aviation, these power-drive units must meet strict requirements whereby the units must accommodate high loads and operate reliably. In addition, there continues to be a requirement that usually a power-drive unit (PDU) must be lowerable in a de-energized state.

A multiplicity of conventional PDUs are used in freight compartments, which PDUs in the event of a failure can bring the entire flight operation to a halt—an undesirable effect.

In addition, the aircraft structure is very much affected and impaired when using conventional PDUs due to the rigid connection to the structure—an undesirable effect.

The problem to be solved by this invention is to create an apparatus of the type mentioned in the introduction that eliminates the referenced disadvantages, and that simply and cost-effectively makes such transport possible using actively and/or passively driven transport rollers of PDUs in a way that avoids impairment of the structure, and in the de-energized state optionally either lowers or remains pressed in place in the extended position.

An additional goal is to be able to significantly reduce the weight of the PDU.

The approach to solving this problem lies in the lifting unit having at least one actuator that acts on at least one actuating element.

What has proven especially advantageous in this invention is to create a lifting unit that axially moves front-side receivers outward by means of at least one actuator, and optionally at least one energy-storing element, in order to act with high force on a toggle mechanism so as to generate high pressing forces.

Transport rollers, braking rollers, drive rollers, or the like can then be extended from the power-drive unit by means of the toggle mechanisms either directly or indirectly, optionally by means of swing frames or other redirecting elements so as to press against the freight container, lift the container, or advance this container. This toggle mechanism can be produced so as to be very light and provide a reduction in weight.

It has proven advantageous here to dispose the actuator, or a component thereof, such as a spindle and/or at least one energy-storing element, so as to be supported in an axially movable and floating manner within the housing of the lifting unit, with the result that an equalization of force is effected on the front side for both toggle mechanisms.

As a result, the force can be transferred uniformly to the transport roller in a gentle, cushioned, cushioned-dampened fashion, the roller thus also equalizing unevenness in the container, or in its surface, so as to avoid damage to the structure. What can be used as the actuators here are electrical drives, or also other actuators, such as for example hydraulic, pneumatic, electromechanical drives that interact with the at least one energy-storing element, spring element, or the like, so as to ensure the uniform application of force on both toggle mechanisms in a cushioned-dampened or floating manner. This too shall be within the scope of the invention.

As a result, the transport roller can be lowered, for example, in the de-energized state, such that the spindle can be moved back, for example, by the spindle nut in the de-energized state, thereby ensuring the ability to continue loading or unloading, for example, even in the event of a power failure or defect in the motor or the like.

Alternatively, it is possible to design the spindle with a self-locking means, thereby providing a braking action for the rollers even in the de-energized state.

In addition, the damping or swinging support provides significant load relief for the structure of the aircraft, in particular, the frame structure, within which the PDU is installed, since no impacts from the motion of the loads, in particular, from the container, are introduced direction into the structure, but instead these loads are accommodated with a damping effect.

Additional advantages, features, and details of the invention are revealed in the following description of preferred embodiments and based on the drawing, wherein FIG. 1 is a schematically-illustrated perspective bottom view of an apparatus for transporting freight, in particular, a power-drive unit PDU);

Figure 1:
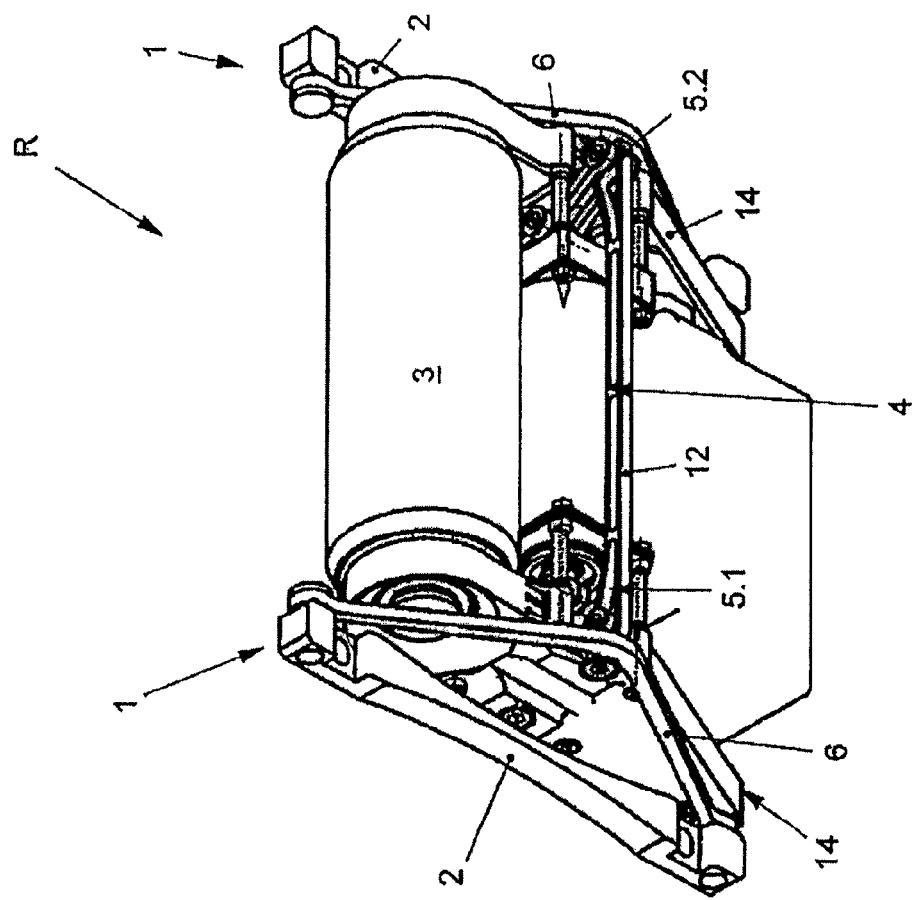

As indicated in FIG. 1, apparatus R has a frame 1 for transporting freight, in particular, freight containers in the freight compartments of aircraft, wherein a transport roller 3 as well as a lifting unit 4 are provided between corresponding frame legs 2.

Lifting unit 4 is supported on a subframe 6 associated with frame leg 2 respectively by a first toggle mechanism 5.1 and a second toggle mechanism 5.2 as the actuating element. Transport roller 3 can be designed as a braking roller, actively-driven drive roller, or the like. This is swung out or extended in the conventional manner relative to frame 1 or subframe 6 in the normal-use position.

Figure 2:
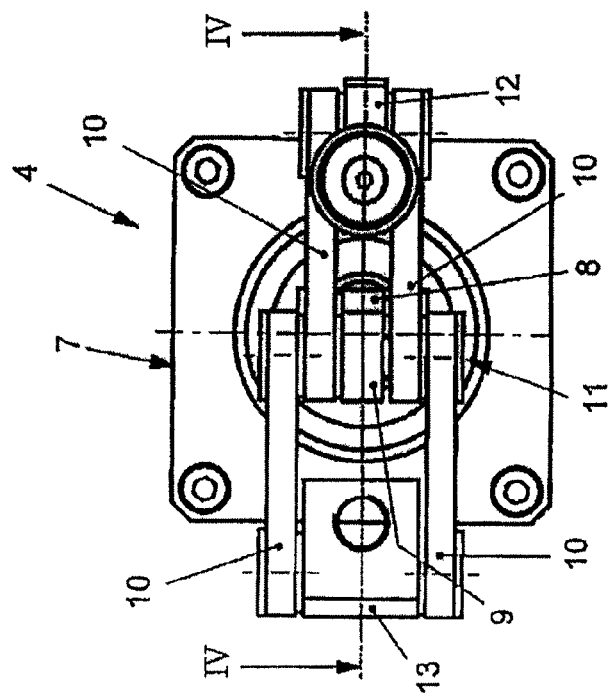
FIG. 2 is a schematically-illustrated side view of part of a lifting unit of the apparatus.
Figure 3:
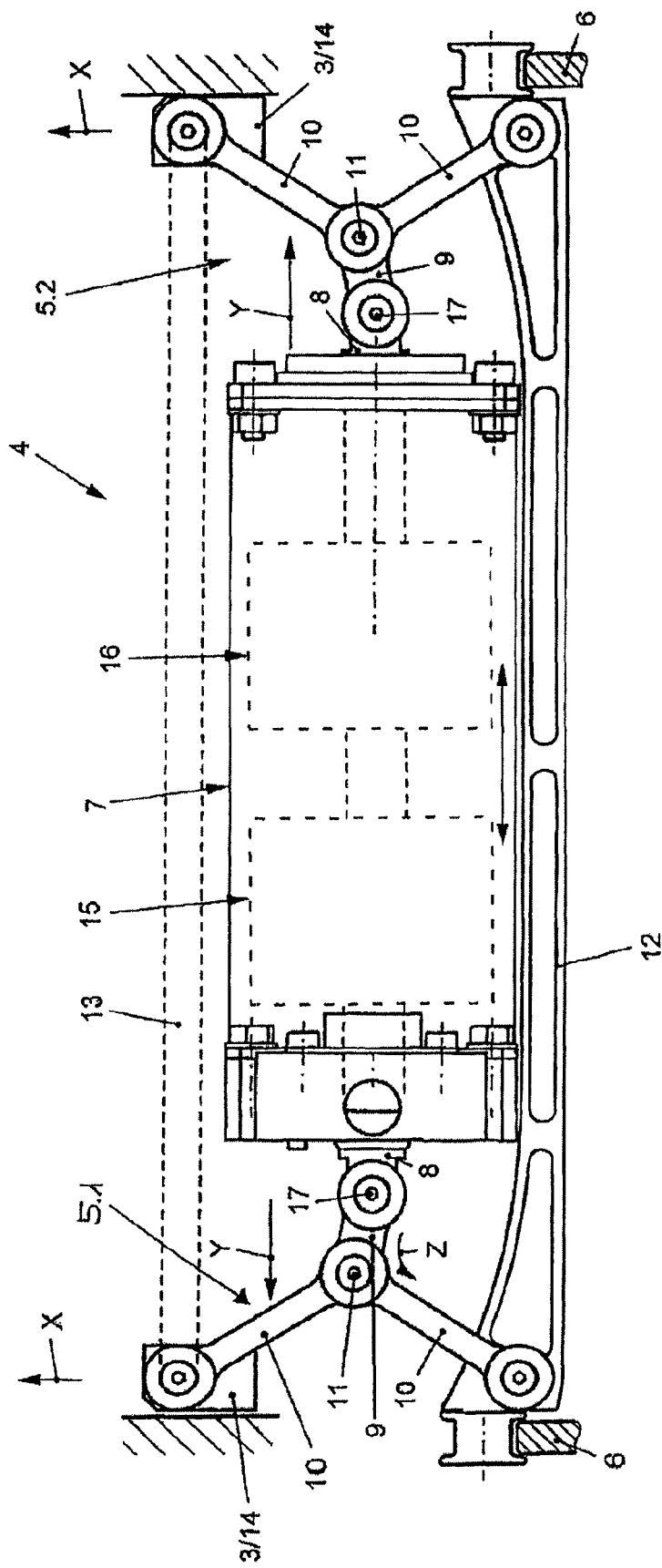
FIG. 3 is a schematically-illustrated top view of a lifting unit as a component of the apparatus.

As is evident in FIGS. 2 and 3, lifting unit 4 has a housing 7 from which receivers 8 project at the end, to which receivers toggle mechanisms 5.1, 5.2 connect. In the preferred embodiment of FIG. 3, articulatedly-mounted intermediate links 9 each connect at the end to the receivers 8, to which links in turn push rods 10 oriented at an angle relative to each other in articulated fashion connect through a toggle joint 11.

Below lifting unit 4, at the ends of the push rods 10 of toggle mechanisms 5.1, 5.2, these connect in articulated fashion to a main brace 12, wherein the other push rods 10 of toggle mechanisms 5.1, 5.2 also connect at the end in articulated fashion to a common tension strut 13.

At the end of tension strut 13, this strut is, and/or push rods 10 connecting there are, connected, for example, directly or indirectly to transport roller 3 or to a subframe 14 so as to extend or swing out transport roller 3 from frame 1 of apparatus R in a direction shown by arrow X.

At least one actuator 15 is provided within lifting unit 4, the actuator moving receivers 8 outward in a direction indicated by arrow Y by means of supporting devices, not shown.

It has proven advantageous here to support receivers 8, or a motion of front-side receivers 8 axially from housing 7, in a cushioned and dampened manner by means of at least one energy-storing element 16.

Electrical drives, electromechanical, pneumatic, or hydraulic drives can be used as actuator 15. Conventional spring elements, rubber elements, buffers, dampers, or the like can be used as energy-storing elements 16.

Using the invention, an equalization of force is able to be effected by means of actuator 15 that is axially supported in a floating manner within housing 7, optionally with energy-storing element 16.

Due to the floating support of both front-side receivers 8, it is possible to uniformly and homogeneously apply a force on the front end and axially in the Y-axis shown to both toggle mechanisms 5.1, 5.2, and thus to both sides, so as to uniformly lift transport roller 3 or swing frame 14 by extracting actuator 15, optionally with an energy-storing element interposed.

As a result, exactly the same force is applied to both sides, wherein furthermore a damping equalization of force is effected as well for the structure of the frame and the structure of the freight compartment.

What has also proven advantageous with this invention is following receiver 8 to connect intermediate link 9 through receiver bearing 17 on one end and through toggle joint 11 on the other end to the respective push rods 10, where the axis of toggle joint 11 is disposed above the axis of receiver bearing 17, as determined by the geometry of intermediate link 9.

This ensures that intermediate link 9 is swung slightly downward, as indicated by the direction of arrow Z, during extension of receiver 8 on the front side from housing 7 of lifting unit 4, while toggle joints 11 are moved in the Y axis, thereby causing transport roller 3, or its swing frame 14, to move upward laterally in the X axis shown. An advantageous aspect here is that due to the position of intermediate link 9 lifting unit 4 remains in a low position near main brace 12, thereby enabling a very flat PDU to be realized, without the need to take into account additional space for a motion by lifting unit 4.

Figure 4A:
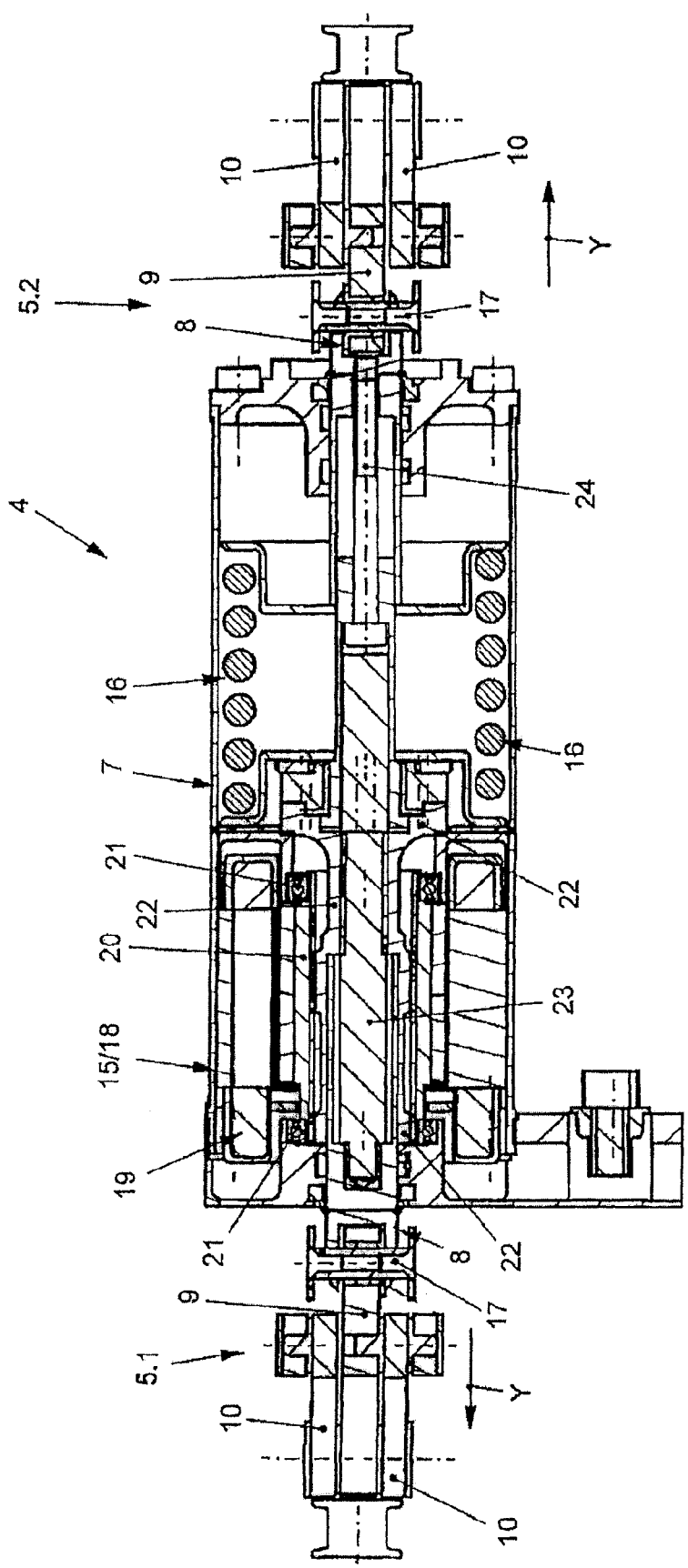
FIG. 4a shows a schematically-illustrated longitudinal section through the lifting unit along line IV-IV in FIG. 2.
Figure 4B:
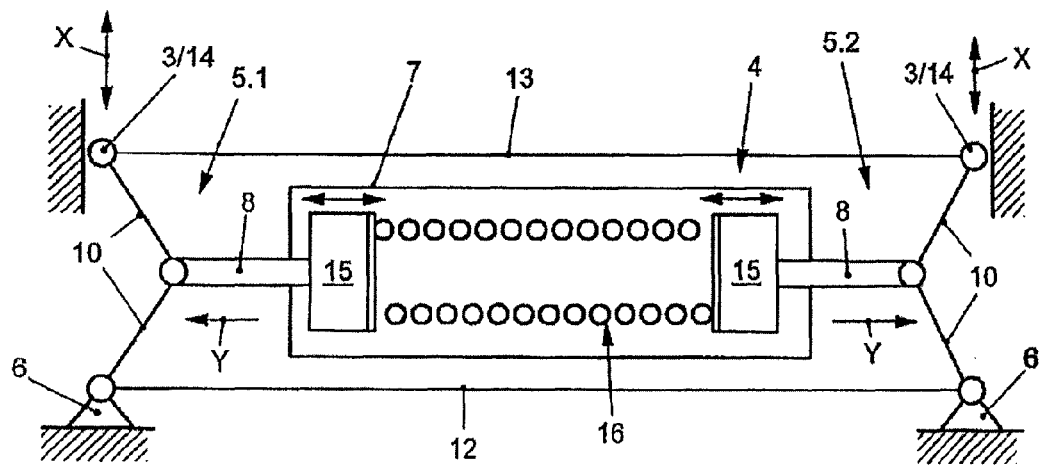
FIGS. 4b and 4c show schematically-illustrated partial-longitudinal sections through additional embodiments of a lifting unit for the power-drive unit.
Figure 4C:
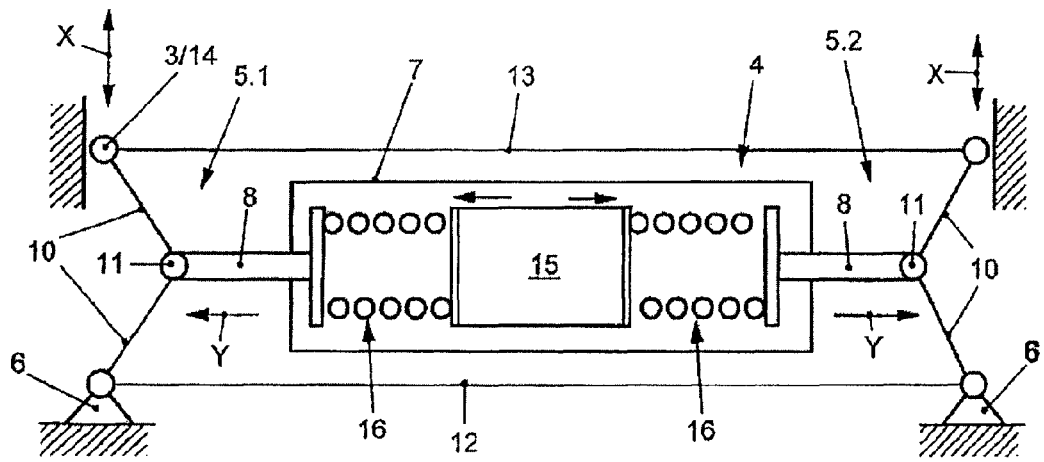

As is also illustrated in FIGS. 4b and 4c, it is also possible to dispose multiple actuators within housing 7 of lifting unit 4, for example, within disposed energy-storing element, as is illustrated in FIG. 4b, wherein actuators 15, controllable either jointly or individually, move both receivers 8 at the front end out of housing 7 so as to apply the desired force to toggle mechanisms 5.1, 5.2.

It is possible here, for example, to dispose two energy-storing elements 16, as shown in FIG. 4c, between receivers 8 and common actuator 15 so as to extend outward in the illustrated X axis transport roller 8 and/or swing frame 14 in an axially floating and cushioned-dampened manner. This too shall be within the scope of the invention.

A preferred embodiment of the lifting unit 4 is described in the embodiment of FIG. 4a.

At one end here, actuator 15 is implemented within housing 7 as an electric drive 18 that has a fixedly disposed stator 19 within housing 7. Within stator 19, a rotor 20 is coaxially disposed and supported in a rotationally radial fashion by means of bearing elements 21. Rotor 20 is equipped with a plurality of permanent magnets, not shown where, and is designed as a magnetic rotor.

A spindle nut 22 is inserted coaxially within magnetically-designed rotor 20, which nut internally meshes in an axially displaceable manner with a hollow-shaft gearing, not shown, of rotor 20.

Spindle nut 21 drives a spindle 23 that directly or indirectly drives the respective front-side receivers so as to move the respective toggle mechanisms 5.1, 5.2 in the Y axis.

In this regard, it has proven advantageous in this invention to provide an energy-storing element 26 attached following spindle 23, in particular, a spring element or the like, which element is connected through pressure elements, not shown, to the front-side receiver so as to move toggle mechanism 5.2.

Spindle 23 and also the pressure element 24 are thus supported within housing 7 so as to be axially movable back and forth through energy-storing element 16 in a floating and cushioned-dampened manner, thereby effecting an equalization of force between toggle mechanisms 5.1, 5.2.

The invention claimed is:

1. Apparatus for transporting freight in freight compartments of aircraft, the apparatus comprising:
   a power-drive unit including a transport roller and a lifting unit, the lifting unit includes a housing and at least one actuator that acts on at least one actuating element;
   wherein at least a part of the actuator is supported in an axially movable manner within the housing; the at least one actuator and at least one energy-storing element act on the at least one actuating element; and the at least one energy-storing element and at least one actuating element are supported axially within lifting unit in a floating manner.

2. The apparatus according to claim 1, wherein the actuating element comprises a first toggle mechanism connected to one side to the lifting unit and a second toggle mechanism connected to another side of the lifting unit.

3. The apparatus according to claim 2, wherein the first and the second toggle mechanisms are interconnected by a main brace and tension strut.

4. The apparatus according to claim 2, wherein an intermediate link connects the first toggle mechanism and the lifting unit, and another intermediate link connects the second toggle mechanism and the lifting unit.

5. The apparatus according to claim 4, wherein each intermediate link is disposed at an angle between a toggle joint of each of the first and second toggle mechanisms and a receiver connected to the actuator or an energy-storing element.

6. The apparatus according to claim 5, wherein the receivers include a receiver bearing and an axis associated with the receiver bearing is below an axis of a toggle joint.

7. The apparatus according to claim 3, wherein the first and second toggle mechanisms each include a plurality of push rods connected on an end in articulated fashion to engage the tension strut and the main brace.

8. The apparatus according to claim 7, wherein the push rods extend angularly from a toggle joint relative to a connected intermediate link.

* * * * *